United States Patent
Park

(10) Patent No.: US 11,038,186 B2
(45) Date of Patent: Jun. 15, 2021

(54) SYSTEM FOR CONTROLLING OPERATION OF REFORMER FOR FUEL CELLS

(71) Applicants: Hyundai Motor Company, Seoul (KR); Kia Motors Corporation, Seoul (KR)

(72) Inventor: Jung Joo Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 131 days.

(21) Appl. No.: 16/540,705

(22) Filed: Aug. 14, 2019

(65) Prior Publication Data

US 2020/0381752 A1 Dec. 3, 2020

(30) Foreign Application Priority Data

May 29, 2019 (KR) .......... 10-2019-0062880

(51) Int. Cl.
*H01M 8/04701* (2016.01)
*B60L 58/32* (2019.01)
(Continued)

(52) U.S. Cl.
CPC ......... *H01M 8/04738* (2013.01); *B60L 58/32* (2019.02); *H01M 8/04067* (2013.01);
(Continued)

(58) Field of Classification Search
CPC ......... H01M 8/04738; H01M 8/04067; H01M 8/04373; H01M 8/04776; H01M 8/0618; B60L 58/32
See application file for complete search history.

(56) References Cited

U.S. PATENT DOCUMENTS

2011/0039172 A1* 2/2011 Kani ............... H01M 8/0612
429/423
2011/0136027 A1* 6/2011 Chen ............... C01B 3/38
429/423
(Continued)

FOREIGN PATENT DOCUMENTS

JP    2004196611 A    7/2004
JP    4136497 B2      8/2008
(Continued)

*Primary Examiner* — Stewart A Fraser
(74) *Attorney, Agent, or Firm* — Mintz Levin Cohn Ferris Glovsky and Popeo, P.C.; Peter F. Corless

(57) ABSTRACT

A system for controlling operation of a reformer for fuel cells is provided. When the temperatures of a high temperature reforming unit operating as an endothermic catalyst reactor and a CO modification unit operating as an exothermic catalyst reactor deviate from catalyst activity reference temperatures, an amount of water supplied for heat exchange is increased so that the water for heat exchange sequentially flows up to the CO modification unit and the high temperature reforming unit. Accordingly, the temperature of the high temperature reforming unit and the temperature of the CO modification unit reach the catalyst activity reference temperatures, thereby preventing deterioration of high-concentration hydrogen production efficiency and unnecessary CO removal efficiency of the reformer and improving lifespan of catalysts of the reformer.

9 Claims, 4 Drawing Sheets

(51) Int. Cl.
    *H01M 8/04007*    (2016.01)
    *H01M 8/0432*    (2016.01)
    *H01M 8/04746*    (2016.01)
    *H01M 8/0612*    (2016.01)
(52) U.S. Cl.
    CPC ... *H01M 8/04373* (2013.01); *H01M 8/04776* (2013.01); *H01M 8/0618* (2013.01)

(56) References Cited

U.S. PATENT DOCUMENTS

2011/0206562 A1* 8/2011 Maenishi .......... H01M 8/04776
　　　　　　　　　　　　　　　　　　　　　　422/109
2016/0293981 A1* 10/2016 Sakai ................ H01M 8/04776

FOREIGN PATENT DOCUMENTS

| KR | 100829089 B1 | 5/2008 |
|----|--------------|--------|
| KR | 20080038229 A | 5/2008 |
| KR | 20170001226 A | 1/2017 |
| KR | 101771303 B1 | 8/2017 |

* cited by examiner

SYSTEM FOR CONTROLLING OPERATION OF REFORMER FOR FUEL CELLS

CROSS-REFERENCE TO RELATED APPLICATION

This application claims under 35 U.S.C. § 119(a) the benefit of priority to Korean Patent Application No. 10-2019-0062880 filed on May 29, 2019, the entire contents of which are incorporated herein by reference.

BACKGROUND

(a) Technical Field

The present invention relates to a system for controlling operation of a reformer for fuel cells, and more particularly, to a system for controlling operation of a reformer for fuel cells which improves durability of catalysts of the reformer and increases a lifetime of the reformer.

(b) Background Art

In general, as a method for producing hydrogen supplied to hydrogen fuel cell vehicles, a method for producing hydrogen by reforming hydrocarbon-based fuel, such a natural gas, is used. For this purpose, a hydrogen production system to produce hydrogen by reforming hydrocarbon-based source gas includes a desulfurizer to adsorb sulfur contained in the source gas, and a reformer to produce synthesis gas containing hydrogen through gas desulfurized through the desulfurizer.

The reformer includes a high temperature reforming unit that operates as an endothermic catalyst reactor which produces hydrogen gas from the fuel containing hydrogen through chemical catalytic reaction by thermal energy, a carbon monoxide (CO) modification unit that operates as an exothermic catalyst reactor which modifies CO generated by the high temperature reforming unit, a CO removal unit which removes remaining CO after modification of CO, and a waste heat discharge unit which discharges thermal energy provided to the high temperature reforming unit.

To normally operate the reformer, the temperatures of the respective unit catalyst reactors (e.g., the high temperature reforming unit, the CO modification unit, etc.) of the reformer should be set to catalyst activity reference temperatures. In other words, only if the temperatures of the respective unit catalyst reactors (e.g., the high temperature reforming unit, the CO modification unit, etc.) of the reformer are set to the catalyst activity reference temperatures, may production of hydrogen of a high concentration, removal of CO, etc. be easily performed.

However, as exemplarily shown in a graph of FIG. 1, when the temperature of the high temperature reforming unit operating as the endothermic catalyst reactor exceeds a first catalyst activity reference temperature (e.g., 700° C.) or the temperature of the CO modification unit operating as the exothermic catalyst reactor deviates from a second catalyst activity reference temperature (e.g., 200° C.), performances and lifetimes of the high temperature reforming unit and the CO modification unit are reduced, and thus, high-concentration hydrogen production efficiency of the reformer is reduced and unnecessary CO removal efficiency of the reformer is reduced.

SUMMARY

The present invention provides system for controlling operation of a reformer for fuel cells in which, when the temperatures of a high temperature reforming unit operating as an endothermic catalyst reactor and a CO modification unit operating as an exothermic catalyst reactor deviate from catalyst activity reference temperatures, an amount of water supplied for heat exchange may be increased to cause the water for heat exchange to sequentially flow up to the CO modification unit and the high temperature reforming unit. Accordingly, the temperature of the high temperature reforming unit and the temperature of the CO modification unit may reach the catalyst activity reference temperatures to prevent lowering of high-concentration hydrogen production efficiency and unnecessary CO removal efficiency of the reformer and improving lifespans of catalysts of the reformer.

In one aspect, the present invention provides a system for controlling operation of a reformer for fuel cells that may include a first temperature sensor mounted in a high temperature reforming unit operating as an endothermic catalyst reactor and configured to sense a temperature of the high temperature reforming unit, a second temperature sensor mounted in a CO modification unit operating as an exothermic catalyst reactor and configured to sense a temperature of the CO modification unit, a first heat exchange path formed at the outside of a waste heat discharge unit, a second heat exchange path formed at the outside of the CO modification unit and connected to the first heat exchange path via a first connection line to be in communication with the first heat exchange path, a third heat exchange path formed at the outside of the high temperature reforming unit and connected to the second heat exchange path via a second connection line to be in communication with the second heat exchange path, a flow control valve mounted at an entrance of the first heat exchange path and configured to adjust an amount of water supplied from a water supply source, and a controller configured to variably adjust an opening and closing degree of the flow control valve based on sensing signals of the first temperature sensor and the second temperature sensor.

In addition, when the temperature of the high temperature reforming unit exceeds a first catalyst activity reference temperature or the temperature of the CO modification unit deviates from a second catalyst activity reference temperature, an amount of water for heat exchange supplied through the first heat exchange path of the waste heat discharge unit may be increased to cause the water for heat exchange to flow up to the second heat exchange path of the CO modification unit or the third heat exchange path of the high temperature reforming unit. Accordingly, the temperature of the high temperature reforming unit may be set to the first catalyst activity reference temperature or the temperature of the CO modification unit may be set to the second catalyst activity reference temperature through heat exchange with water.

A first solenoid valve may be installed at the first connection line to allow or intercept flow of water to the CO modification unit according to a control signal from the controller. In response to determining that the temperature of the CO modification unit is the second catalyst activity reference temperature based on the sensing signal of the second temperature sensor, the controller may be configured to operate the flow control valve to maintain a first opening degree that corresponds to a minimum opening degree and simultaneously close the first solenoid valve, to supply water only to the first heat exchange path of the waste heat discharge unit.

Additionally, in response to determining that the temperature of the CO modification unit is less than the second catalyst activity reference temperature based on the sensing signal of the second temperature sensor, the controller may be configured to adjust the opening degree of the flow control valve to a second opening degree greater than the first opening degree and simultaneously open the first solenoid valve, to supply water up to the second heat exchange path of the CO modification unit via the first heat exchange path of the waste heat discharge unit. A second solenoid valve may be installed at the second connection line to allow or intercept flow of water to the high temperature reforming unit according to a control signal from the controller.

In particular, in response to determining that the temperature of the high temperature reforming unit is the first catalyst activity reference temperature based on the sensing signal of the first temperature sensor, the controller may be configured to operate the flow control valve to maintain the second opening degree and simultaneously close the second solenoid valve, to supply water up to the second heat exchange path of the CO modification unit via the first heat exchange path of the waste heat discharge unit.

In addition, in response to determining that the temperature of the high temperature reforming unit is greater than the first catalyst activity reference temperature based on the sensing signal of the first temperature sensor, the controller may be configured to adjust the opening degree of the flow control valve to a third opening degree greater than the second opening degree and simultaneously open the second solenoid valve, to supply water up to the third heat exchange path of the high temperature reforming unit via the first heat exchange path of the waste heat discharge unit and the second heat exchange path of the CO modification unit.

BRIEF DESCRIPTION OF THE DRAWINGS

The above and other features of the present invention will now be described in detail with reference to exemplary embodiments thereof illustrated in the accompanying drawings which are given herein below by way of illustration only, and thus are not limitative of the present invention, and wherein.

Figure 1:
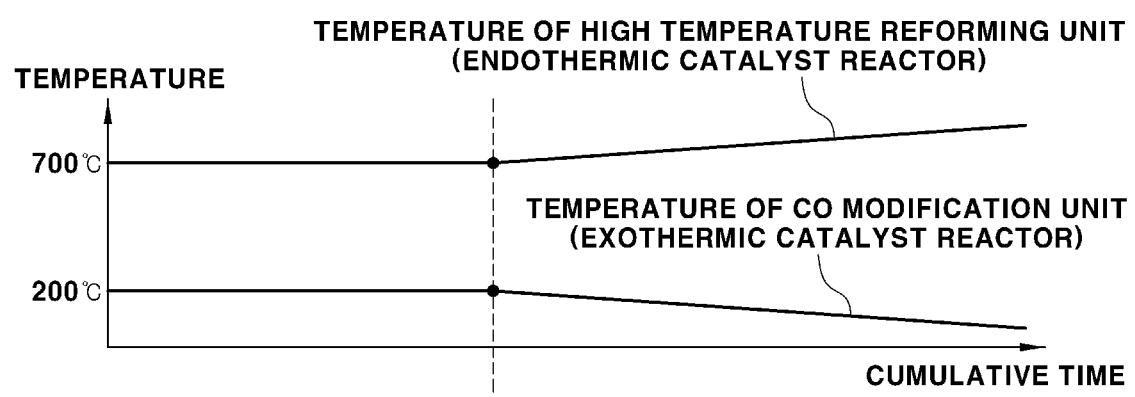
FIG. 1 is a graph illustrating an increase in an amount of water for heat exchange when the temperature of a CO modification unit or the temperature of a high temperature reforming unit deviates from a catalyst activity reference temperature in accordance with an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

Figure 2A:
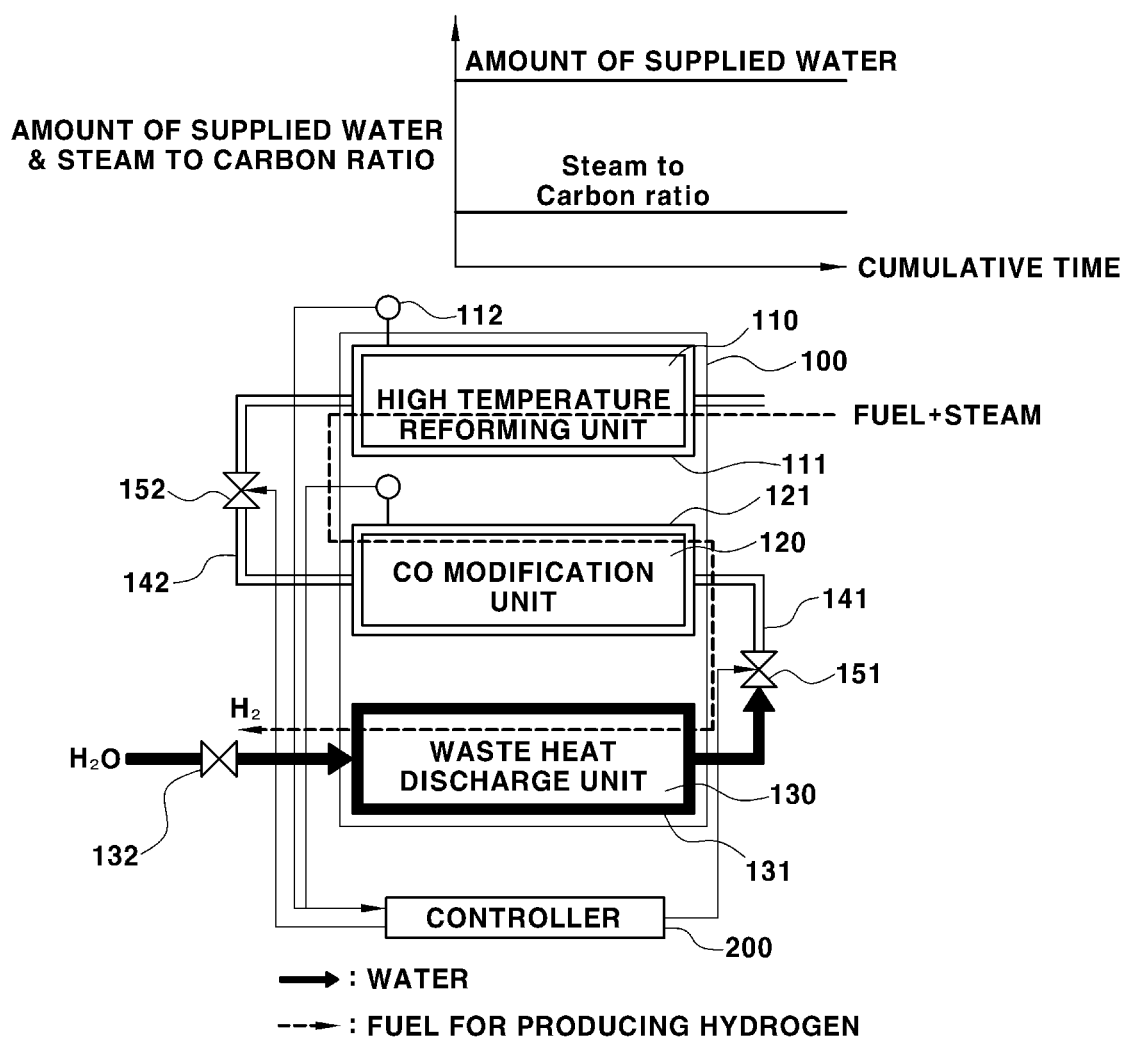
FIGS. 2A to 2C are views illustrating the configuration and operation of a system for controlling operation of a reformer for fuel cells in accordance with an exemplary embodiment of the present invention.
Figure 2B:
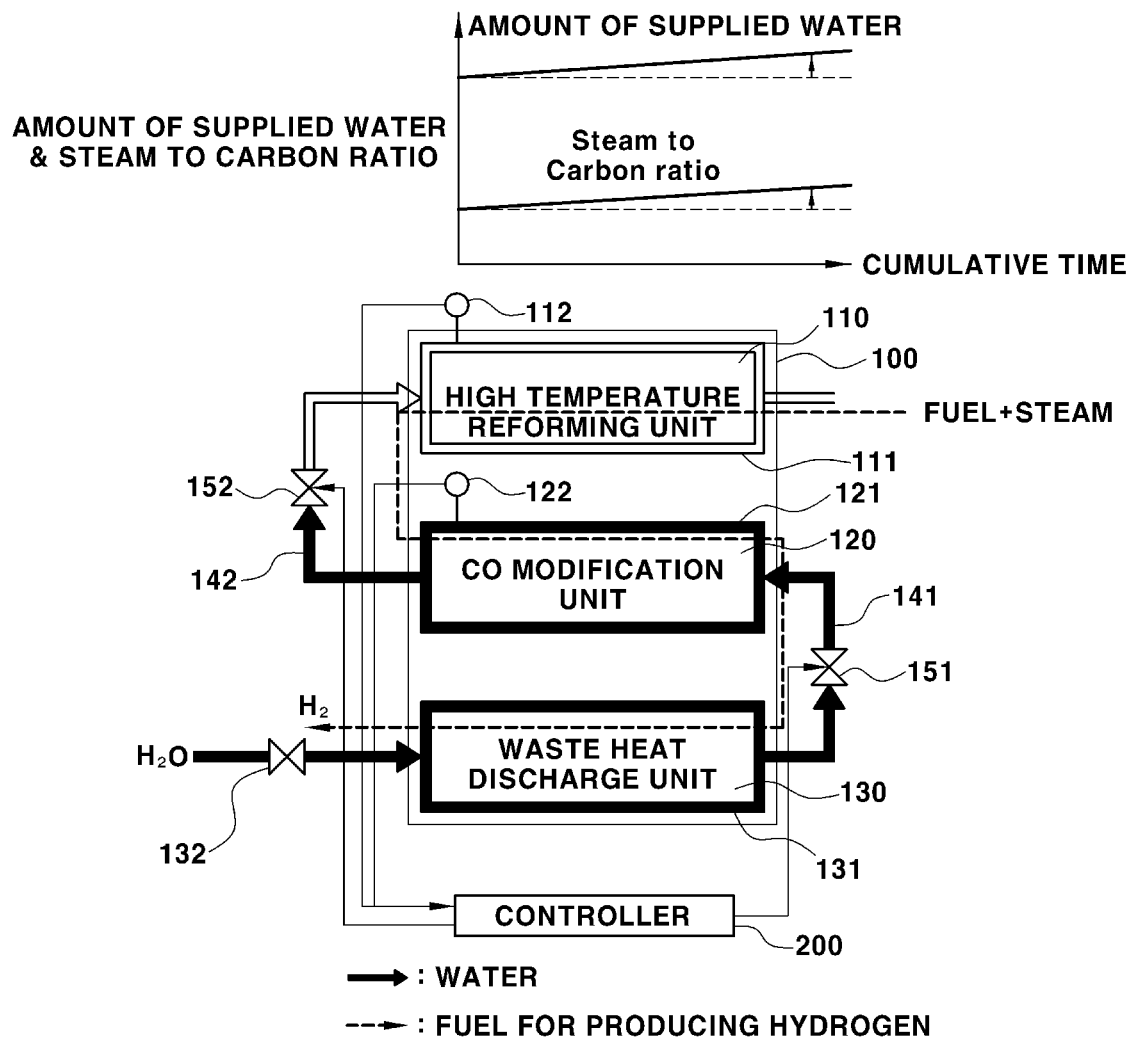
Figure 2C:
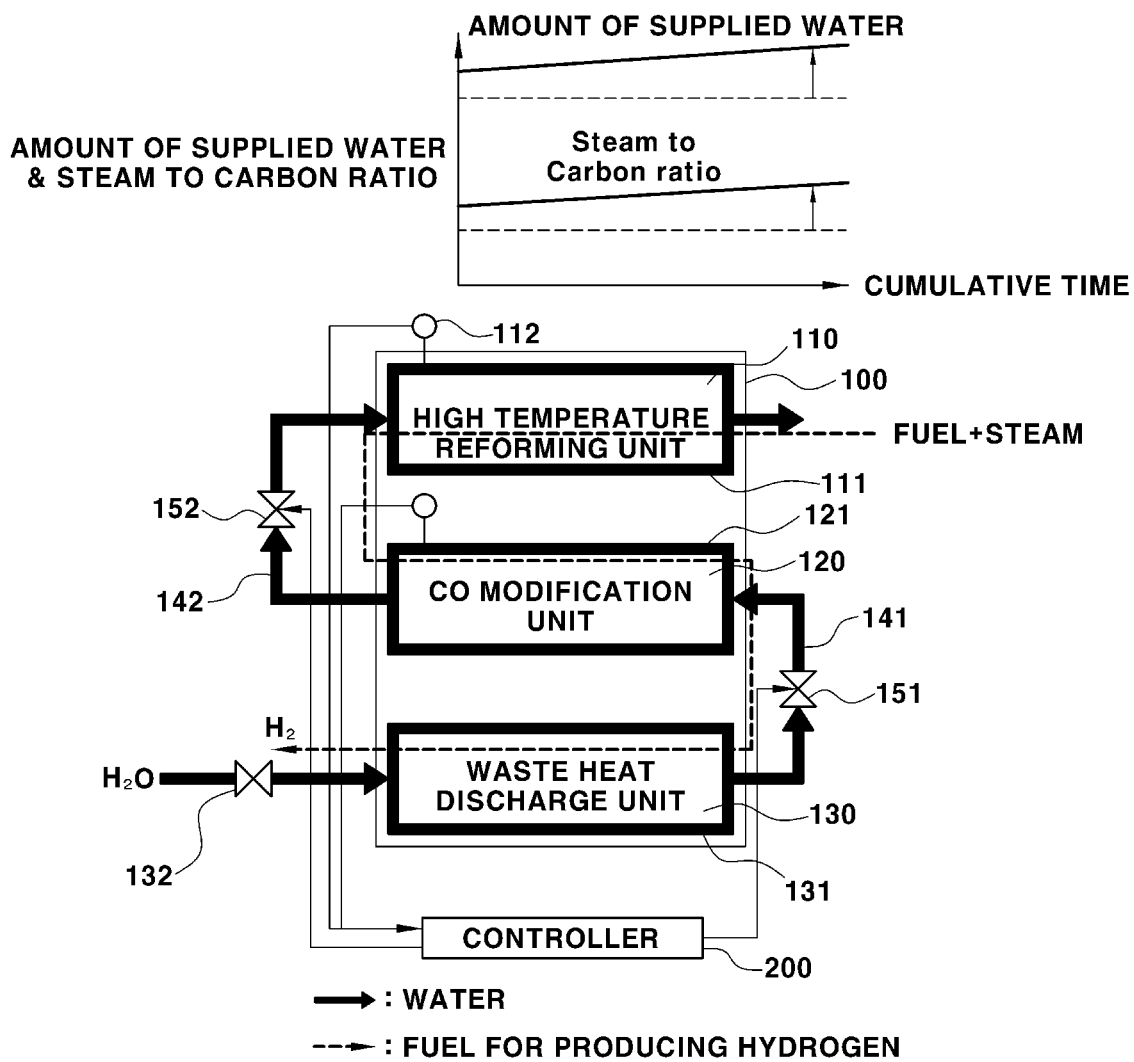

FIGS. 2A to 2C are views illustrating the configuration and operation of a system for controlling operation of a reformer for fuel cells in accordance with the present invention. A reformer 100 for fuel cells has a structure in which a high temperature reforming unit 110, a CO modification unit 120 and a waste heat discharge unit 130 are sequentially arranged in a flow direction of fuel to produce hydrogen (in a direction of an arrow in FIGS. 2A to 2C).

The high temperature reforming unit 110 may operate as an endothermic catalyst reactor, may be maintained at a first catalyst activity reference temperature of about 700° C. by heating using a burner, and may produce hydrogen through catalyst reaction between hydrocarbon-based fuel and steam (in a vaporized state). The CO modification unit 120 may operate as an exothermic catalyst reactor, and may cause catalyst reaction to modify carbon monoxide (CO) generated by the catalyst reaction of the high temperature reforming unit 110 at a second catalyst activity reference temperature of about 200-250° C. which is less than the first catalyst activity reference temperature.

Thereafter, CO modified by the CO modification unit 120 may be removed by a CO removal unit (not shown), and thus, only hydrogen of a high concentration may be extracted. The waste heat discharge unit 130 may be configured to discharge waste gas of the burner generated by operation of the burner, and may be maintained at a temperature of about 150° C. by waste gas of the burner.

As described above with reference to the graph of FIG. 1, when the temperature of the high temperature reforming unit 110 operating as the endothermic catalyst reactor exceeds the first catalyst activity reference temperature (e.g., about 700° C.) or the temperature of the CO modification unit 120 operating as the exothermic catalyst reactor deviates from the second catalyst activity reference temperature (e.g., about 200° C.), performance of the high temperature reforming unit 110 or the CO modification unit 120 is deteriorated, and thus, high-concentration hydrogen production efficiency of the reformer deteriorates and unnecessary CO removal efficiency of the reformer is deteriorates.

Therefore, according to the present invention, when the temperature of the high temperature reforming unit 110 exceeds the first catalyst activity reference temperature or the temperature of the CO modification unit 120 deviates from the second catalyst activity reference temperature, an amount of water for heat exchange supplied through a first heat exchange path 131 of the waste heat discharge unit 130 may be increased to cause water for heat exchange to flow up to a second heat exchange path 121 of the CO modification unit 120 or a third heat exchange path 111 of the high temperature reforming unit 110. Accordingly, the temperature of the high temperature reforming unit 110 may beset to the first catalyst activity reference temperature or the temperature of the CO modification unit 120 may beset to the second catalyst activity reference temperature through heat exchange with water.

For this purpose, a first temperature sensor 112 configured to sense the temperature of the high temperature reforming unit 110 operating as the endothermic catalyst reactor may be installed in the high temperature reforming unit 110, and a second temperature sensor 122 configured to sense the temperature of the CO modification unit 120 operating as the exothermic catalyst reactor may be installed in the CO modification unit 120. In particular, sensing signals of the first temperature sensor 112 and the second temperature sensor 122 may be transmitted to a controller 200 in real time.

Further, the first heat exchange path 131 may be formed at the outside of the waste heat discharge unit 130. The second heat exchange path 121 connected to the first heat exchange path 131 via a first connection line 141 to be in communication with the first heat exchange path 131 may be formed at the outside of the CO modification unit 120. In addition, the third heat exchange path 111 connected to the second heat exchange path 121 via a second connection line 142 to be in communication with the second heat exchange path 121 may be formed at the outside of the high temperature reforming unit 110.

A flow control valve 132 configured to adjust an amount of water supplied from a water supply source (e.g., a water storage tank and a pump configured to pump water out of the water storage tank) may be mounted at an entrance or inlet of the first heat exchange path 131 of the waste heat discharge unit 130. Further, a first solenoid valve 151 may be installed at the first connection line 141 to allow or intercept flow of water to the second heat exchange path 121 of the CO modification unit 120 according to a control signal from the controller 200.

In addition, a second solenoid valve 152 may be installed at the second connection line 142 to allow or intercept flow of water to the third heat exchange path 111 of the high temperature reforming unit 110 according to a control signal from the controller 200. The controller 200 may be configured to variably adjust an opening and closing degree of the flow control valve 132 to adjust the amount of supplied water, and turn the first and second solenoid valves 151 and 152 on and off to allow or intercept flow of water to the second heat exchange path 122 and the third heat exchange path 111, based on the sensing signals of the first temperature sensor 112 and the second temperature sensor 122.

Hereinafter, a process for operating the reformer will be described based on the above-described configuration. First, the controller 200 may be configured to compare the temperature of the CO modification unit 120 to the second catalyst activity reference temperature (e.g., about 200° C.) based on the sensing signal of the second temperature sensor 122. As a result of comparison, in response to determining that the temperature of the CO modification unit 120 is maintained at the second catalyst activity reference temperature, the controller 200 may be configured to operate the flow control valve 132 to maintain a first opening degree, i.e., the minimum opening degree, to circulate a designated amount of water maintained within a designated temperature range (e.g., about 150° C.-200° C.), and simultaneously close the first solenoid valve 151 to supply water passing through the flow control valve 132 from the water supply source to the first heat exchange path 131 of the waste heat discharge unit 130, as exemplarily shown in FIG. 2A.

In response to determining that the temperature of the CO modification unit 120 is less than the second catalyst activity reference temperature, the controller 200 may be configured to adjust the opening degree of the flow control valve 132 to a second opening degree which is greater than the first opening degree, to increase the amount of water, and simultaneously open the first solenoid valve 151, to thus increase the amount of supplied water and simultaneously supply water up to the second heat exchange path 121 of the CO modification unit 120 via the first heat exchange path 131 of the waste heat discharge unit 130, as exemplarily shown in FIG. 2B.

In particular, since the temperature of water supplied up to the second heat exchange path 121 of the CO modification unit 120 is increased through heat exchange with the waste heat discharge unit 130, decreasing the temperature of the CO modification unit 120 may be prevented and, simultaneously, conditions to cause exothermic reaction of the CO modification unit 120 operating as the second catalyst reactor may be generated through increase in water supply, may be generated and thus the temperature of the CO modification unit 120 may be increased to the second catalyst activity reference temperature.

Further, the controller 200 may be configured to compare the temperature of the high temperature reforming unit 110 to the first catalyst activity reference temperature (e.g., about 700° C.) based on the sensing signal of the first temperature sensor 112. As a result of comparison, in response to determining that the temperature of the high temperature reforming unit 110 is maintained at the first catalyst activity reference temperature, the controller 200 may be configured to operate the flow control valve 132 to maintain the second opening degree, open the first solenoid valve 151 and close the second solenoid valve 152 to thus continuously supply water up to the second heat exchange path 121 of the CO modification unit 120 via the first heat exchange path 131 of the waste heat discharge unit 130, as exemplarily shown in FIG. 2B.

In response to determining that the temperature of the high temperature reforming unit 110 is greater than the first catalyst activity reference temperature, the controller 200 may be configured to adjust the opening degree of the flow control valve 132 to a third opening degree which is greater than the second opening degree, to increase the amount of water, and simultaneously open the second solenoid valve 152 in addition to the first solenoid valve 151 to thus further increase the amount of supplied water and simultaneously supply water up to the third heat exchange path 111 of the high temperature reforming unit 110 via the first heat exchange path 131 of the waste heat discharge unit 130 and the second heat exchange path 121 of the CO modification unit 120, as exemplarily shown in FIG. 2C.

In particular, since the temperature of water supplied up to the third heat exchange path 111 of the high temperature reforming unit 110 is increased through heat exchange with the waste heat discharge unit 130 and the CO modification unit 120 but is not increased to the first catalyst activity reference temperature (e.g., about 700° C.) or greater, the water may cool the temperature of the high temperature reforming unit 110, and thus, the temperature of the high temperature reforming unit 110 may be decreased to the first catalyst activity reference temperature.

As described above, the temperature of the CO modification unit 120 may be maintained at the second catalyst activity reference temperature and the temperature of the high temperature reforming unit 110 may be maintained at the first catalyst activity reference temperature, thereby minimizing degradation of performances and shortening of lifespans of the high temperature reforming unit 110 and the CO modification unit 120, and preventing deterioration of high-concentration hydrogen production efficiency and unnecessary CO removal efficiency of the reformer.

As is apparent from the above description, a system for controlling operation of a reformer for fuel cells in accordance with the present invention has effects, as follows.

First, when the temperature of a CO modification unit operating as an exothermic catalyst reactor is decreased to less than a second catalyst activity reference temperature, an amount of supplied water, the temperature of which is increased through heat exchange with a waste heat discharge unit, is increased so that water flows up to a heat exchange path of the CO modification unit, and thus, further decreasing of the temperature of the CO modification unit may be prevented and the temperature of the CO modification unit may be increased to and maintained at the second catalyst activity reference temperature.

Second, when the temperature of a high temperature reforming unit operating as an endothermic catalyst reactor is greater than a first catalyst activity reference temperature, the amount of supplied water is further increased so that water flows up to a heat exchange path of the high temperature reforming unit via the waste heat discharge unit and the CO modification unit, and thus, further increasing of the temperature of the high temperature reforming unit may be prevented and the temperature of the high temperature reforming unit may be decreased to and maintained at the first catalyst activity reference temperature.

Third, the temperature of the CO modification unit is maintained at the second catalyst activity reference temperature and the temperature of the high temperature reforming unit is maintained at the first catalyst activity reference temperature, thereby preventing deterioration of high-concentration hydrogen production efficiency and unnecessary CO removal efficiency of the reformer and improving durability lifespans of the high temperature reforming unit operating as the endothermic catalyst reactor and the CO modification unit operating as the exothermic catalyst reactor.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A system for controlling operation of a reformer for fuel cells, comprising:
   a first temperature sensor mounted in a high temperature reforming unit operating as an endothermic catalyst reactor and configured to sense a temperature of the high temperature reforming unit;
   a second temperature sensor mounted in a carbon monoxide (CO) modification unit operating as an exothermic catalyst reactor and configured to sense a temperature of the CO modification unit;
   a first heat exchange path formed at the outside of a waste heat discharge unit;
   a second heat exchange path formed at the outside of the CO modification unit and connected to the first heat exchange path via a first connection line to be in communication with the first heat exchange path;
   a third heat exchange path formed at the outside of the high temperature reforming unit and connected to the second heat exchange path via a second connection line to be in communication with the second heat exchange path;
   a flow control valve mounted at an inlet of the first heat exchange path to adjust an amount of water supplied from a water supply source; and
   a controller configured to variably adjust an opening and closing degree of the flow control valve based on sensing signals of the first temperature sensor and the second temperature sensor.

2. The system of claim 1, wherein the controller is configured to increase an amount of water for heat exchange supplied through the first heat exchange path of the waste heat discharge unit when the temperature of the high temperature reforming unit exceeds a first catalyst activity reference temperature or the temperature of the CO modification unit deviates from a second catalyst activity reference temperature so that the water for heat exchange flows up to the second heat exchange path of the CO modification unit or the third heat exchange path of the high temperature reforming unit, and wherein the temperature of the high temperature reforming unit is set to the first catalyst activity reference temperature or the temperature of the CO modification unit is set to the second catalyst activity reference temperature through heat exchange with water.

3. The system of claim 1, further comprising:
   a first solenoid valve installed at the first connection line to allow or intercept flow of water to the CO modification unit according to a control signal from the controller.

4. The system of claim 3, wherein in response to determining that the temperature of the CO modification unit is the second catalyst activity reference temperature based on the sensing signal of the second temperature sensor, the controller is configured to operate the flow control valve to maintain a first opening degree corresponding to a minimum opening degree and simultaneously close the first solenoid valve to supply water to the first heat exchange path of the waste heat discharge unit.

5. The system of claim 3, wherein in response to determining that the temperature of the CO modification unit is less than the second catalyst activity reference temperature based on the sensing signal of the second temperature sensor, the controller is configured to adjust the opening degree of the flow control valve to a second opening degree greater than a first opening degree and simultaneously open the first solenoid valve to supply water up to the second heat exchange path of the CO modification unit via the first heat exchange path of the waste heat discharge unit.

6. The system of claim 3, further comprising:
a second solenoid valve installed at the second connection line to allow or intercept flow of water to the high temperature reforming unit according to a control signal from the controller.

7. The system of claim 6, wherein in response to determining that the temperature of the high temperature reforming unit is the first catalyst activity reference temperature based on the sensing signal of the first temperature sensor, the controller is configured to operate the flow control valve to maintain a second opening degree and simultaneously close the second solenoid valve to supply water up to the second heat exchange path of the CO modification unit via the first heat exchange path of the waste heat discharge unit.

8. The system of claim 6, wherein in response to determining that the temperature of the high temperature reforming unit is greater than the first catalyst activity reference temperature based on the sensing signal of the first temperature sensor, the controller is configured to adjust the opening degree of the flow control valve to a third opening degree greater than a second opening degree and simultaneously open the second solenoid valve, so as to supply water up to the third heat exchange path of the high temperature reforming unit via the first heat exchange path of the waste heat discharge unit and the second heat exchange path of the CO modification unit.

9. A vehicle having a system for controlling operation of a reformer for fuel cells, comprising:
a first temperature sensor mounted in a high temperature reforming unit operating as an endothermic catalyst reactor and configured to sense a temperature of the high temperature reforming unit;
a second temperature sensor mounted in a carbon monoxide (CO) modification unit operating as an exothermic catalyst reactor and configured to sense a temperature of the CO modification unit;
a first heat exchange path formed at the outside of a waste heat discharge unit;
a second heat exchange path formed at the outside of the CO modification unit and connected to the first heat exchange path via a first connection line to be in communication with the first heat exchange path;
a third heat exchange path formed at the outside of the high temperature reforming unit and connected to the second heat exchange path via a second connection line to be in communication with the second heat exchange path;
a flow control valve mounted at an inlet of the first heat exchange path to adjust an amount of water supplied from a water supply source; and
a controller configured to variably adjust an opening and closing degree of the flow control valve based on sensing signals of the first temperature sensor and the second temperature sensor.

* * * * *